US012354117B1

United States Patent
Lee et al.

(10) Patent No.: US 12,354,117 B1
(45) Date of Patent: Jul. 8, 2025

(54) AUTOMATED TECHNOLOGIES FOR ASSESSING AND CERTIFYING THE SAFETY OF AI-BASED PRODUCTS BASED ON MACHINE LEARNING ANALYSIS

(71) Applicant: UL LLC, Northbrook, IL (US)

(72) Inventors: Young Min Lee, Old Westbury, NY (US); Sudhi Ranjan Sinha, Highland Park, IL (US)

(73) Assignee: UL LLC, Northbrook, IL (US)

( * ) Notice: Subject to any disclaimer, the term of this patent is extended or adjusted under 35 U.S.C. 154(b) by 0 days.

(21) Appl. No.: 19/033,441

(22) Filed: Jan. 21, 2025

(51) Int. Cl.
  *G06N 20/00* (2019.01)
  *G06Q 10/0639* (2023.01)
  *G06Q 30/018* (2023.01)

(52) U.S. Cl.
  CPC .......... *G06Q 30/018* (2013.01); *G06N 20/00* (2019.01); *G06Q 10/06393* (2013.01)

(58) Field of Classification Search
  CPC . G06N 20/00; G06Q 30/018; G06Q 10/06393
  See application file for complete search history.

(56) References Cited

U.S. PATENT DOCUMENTS

2024/0273411 A1* 8/2024 Mueck ................ H04L 9/3263

OTHER PUBLICATIONS

Morik, "Yes we care!—Certification for machine learning methods through the care label framework", Frontiers in Artificial Intelligence, Published Sep. 21, 2022. (Year: 2022)*

* cited by examiner

*Primary Examiner* — Dave Misir
(74) *Attorney, Agent, or Firm* — MARSHALL, GERSTEIN & BORUN LLP (57) ABSTRACT

Systems and methods for assessing AI safety scores for AI-based products and facilitating the certification of these products based on their adherence to established AI safety principles, are provided. A trained machine learning model determines the relevancy of specific safety requirements to a given AI-based product. A degree of conformance of the AI-based product to these relevant requirements is determined and relative weights to each requirement are assigned. The AI safety score is calculated based on these parameters, with the AI-based product achieving AI safety certification if the score meets or exceeds a configurable safety threshold.

18 Claims, 4 Drawing Sheets

AUTOMATED TECHNOLOGIES FOR ASSESSING AND CERTIFYING THE SAFETY OF AI-BASED PRODUCTS BASED ON MACHINE LEARNING ANALYSIS

FIELD

The present disclosure relates generally to the field of artificial intelligence (AI) safety evaluation and certification. More specifically, it pertains to platforms and techniques for automating the assessment of AI-based products against established safety principles and requirements using machine learning techniques.

BACKGROUND

The advent and rapid evolution of Artificial Intelligence (AI) technologies have ushered in a new era of innovation, transforming a wide array of consumer and industrial products. This transformation is underscored by significant technological milestones, including the development and application of Machine Learning (ML), the resurgence of Deep Learning (DL) technologies, and the emergence of Generative AI (GenAI). These advancements have been instrumental in enhancing various aspects of human life, including wellness, convenience, productivity, efficiency, and innovation, across multiple sectors.

Despite these advancements, the integration of AI technologies into everyday products and services introduces complex challenges and raises significant safety and ethical concerns. AI-based products or systems, if misused, malfunctioning, or subjected to malicious attacks, have the potential to cause considerable harm, both unintentional and intentional. These harms can manifest as physical injuries, financial losses, social disruptions, and a significant erosion of public trust in AI technologies. Moreover, AI-based products or systems that are improperly trained or designed without ethical considerations can lead to outcomes that disproportionately impact specific groups of people, further exacerbating issues of fairness and bias.

Current assessment techniques present unique challenges that need to be addressed to ensure the safety and ethical deployment of AI-based products. In particular, current methodologies and frameworks for evaluating the safety of AI-based products fall short in comprehensively addressing the multifaceted risks associated with AI deployment. These shortcomings include a lack of standardized procedures for assessing data handling protocols, the performance of machine learning algorithms, adaptive training methodologies, predictive and decision-making processes, and the overall integrity and reliability of AI-based products or systems.

Furthermore, existing approaches to AI safety and ethics do not fully account for the dynamic nature of AI technologies and the evolving landscape of safety standards and regulations. This gap highlights the need for adaptable and forward-thinking procedures that can keep pace with technological advancements while ensuring that AI-based products are safe, ethical, and trustworthy.

In response to these challenges, there is an opportunity for a comprehensive technology that accounts for any necessary requirements and implements guidelines to evaluate the safety of AI-based products effectively.

SUMMARY

A technological improvement that addresses issues of reliability, robustness, transparency, fairness, bias, and data privacy through a systematic evaluation process. The embodiments that implement the improvement may align with existing and upcoming standards and methodologies defined by recognized standards organizations and regulatory bodies, ensuring a holistic and rigorous evaluation process that bridges the gap between rapid technological advancement and the development of corresponding safety standards. Establishing AI-based product safety is vital for building public trust and ensuring the responsible adoption of beneficial AI technologies, addressing the shortcomings and challenges associated with the state of the art in AI safety and ethics.

In an embodiment, a computer-implemented method of assessing artificial intelligence (AI) safety scores for AI-based products according to a plurality of AI safety principles, wherein each of the plurality of AI safety principles has a set of requirements associated therewith, is provided. The computer-implemented method may include: accessing, by at least one computer processor, a training dataset comprising a training set of descriptions associated with a training set of AI-based products; training, by at least one computer processor, a machine learning model using the training dataset; accessing, by the at least one computer processor, a description of an AI-based product; analyzing, using the trained machine learning model by the at least one computer processor, the description of the AI-based product to determine a set of relevant requirements, of the set of requirements for each of the plurality of AI safety principles, wherein each of the set of relevant requirements is determined to be relevant to the AI-based product; determining, based on the description of the AI-based product by the at least one computer processor for each of the set of relevant requirements, (i) a degree of conformance to that relevant requirement, and (ii) a relative weight of that relevant requirement; calculating, by the at least one computer processor based on the degree of conformance to each of the set of relevant requirements and the relative weight of each of the set of relevant requirements, an AI safety score for the AI-based product; determining, by the at least one computer processor, that the AI safety score at least meets a threshold score; and in response to determining that the AI safety score at least meets the threshold score, certifying the AI-based product.

In another embodiment, a system for assessing artificial intelligence (AI) safety scores for AI-based products according to a plurality of AI safety principles, wherein each of the plurality of AI safety principles has a set of requirements associated therewith, is provided. The system may include: a memory storing a set of computer-readable instructions and a machine learning model; and at least one computer processor interfaced with the memory. The at least one processor may be configured to execute the set of computer-readable instructions to cause the at least one computer processor to: access a training dataset comprising a training set of descriptions associated with a training set of AI-based products, train the machine learning model using the training dataset, access a description of an AI-based product, analyze, using the trained machine learning model, the description of the AI-based product to determine a set of relevant requirements, of the set of requirements for each of the plurality of AI safety principles, wherein each of the set of relevant requirements is determined to be relevant to the AI-based product, determine, based on the description of the AI-based product for each of the set of relevant requirements, (i) a degree of conformance to that relevant requirement, and (ii) a relative weight of that relevant requirement, calculate, based on the degree of conformance to each of the set of relevant requirements and the relative weight of each of the set of relevant requirements, an AI safety score for the AI-based product, determine that the AI safety score at least meets a threshold score, and in response to determining that the AI safety score at least meets the threshold score, certify the AI-based product.

Further, in an embodiment, a non-transitory computer-readable storage medium configured to store instructions executable by one or more processors to assess artificial intelligence (AI) safety scores for AI-based products according to a plurality of AI safety principles, wherein each of the plurality of AI safety principles has a set of requirements associated therewith, is provided. The instructions may include: instructions for accessing a training dataset comprising a training set of descriptions associated with a training set of AI-based products; instructions for training a machine learning model using the training dataset; instructions for accessing a description of an AI-based product; instructions for analyzing, using the trained machine learning model, the description of the AI-based product to determine a set of relevant requirements, of the set of requirements for each of the plurality of AI safety principles, wherein each of the set of relevant requirements is determined to be relevant to the AI-based product; instructions for determining, based on the description of the AI-based product for each of the set of relevant requirements, (i) a degree of conformance to that relevant requirement, and (ii) a relative weight of that relevant requirement; instructions for calculating, based on the degree of conformance to each of the set of relevant requirements and the relative weight of each of the set of relevant requirements, an AI safety score for the AI-based product; instructions for determining that the AI safety score at least meets a threshold score; and instructions for, in response to determining that the AI safety score at least meets the threshold score, certifying the AI-based product.

DETAILED DESCRIPTION

The present embodiments may relate to assessing the safety of AI-based products through the determination of an AI safety score. According to certain aspects, the embodiments leverage advancements in machine learning and data analysis to automate and refine the process of evaluating AI-based products against established safety principles. By training and integrating a machine learning model, the embodiments systematically determine the relevancy of specific safety requirements to any given AI-based product, assess the degree of conformance to these requirements, and assign relative weights to each, reflecting their significance in ensuring the safety of the AI-based product.

A configurable AI safety threshold may be determined based on the risk level associated with the intended use and/or operational context of the AI-based product. This threshold may be accounted for in certifying the safety of AI-based products, as it allows for a flexible yet rigorous evaluation tailored to the unique risk profile of each AI-based product. Products that meet or exceed this threshold may achieve an AI safety certification, signifying their compliance with safety standards and their commitment to upholding established levels of safety and reliability.

The systems and methods as described herein offer a significant improvement and advancement to a technology or technological field, namely safety certification technologies (including AI safety certification technologies). This technological field is essential for ensuring that AI-based products or systems are developed, deployed, and utilized in a manner that prioritizes safety, reliability, and adherence to ethical standards, particularly in applications where the potential for harm is significant. Generally, AI safety certification technologies focus on developing methodologies, tools, and frameworks that assess and certify the safety of AI systems and products against established safety principles and requirements. The objective is to mitigate potential risks and ensure that AI technologies are deployed in a responsible and safe manner across various industries and applications.

Conventional solutions in AI safety certification rely on static, one-size-fits-all assessment criteria that do not account for the varying levels of risk associated with different AI-based applications or products. These methods lack the flexibility to adapt to the unique characteristics and risk profiles of individual AI-based products or systems, leading to either overly stringent or insufficiently rigorous safety evaluations. Additionally, manual assessment processes are time-consuming, prone to human error, and do not consistently capture the nuances of complex AI behaviors, making them insufficient for the dynamic and rapidly evolving landscape of AI technologies.

The described embodiments introduce a significant improvement over conventional solutions by providing a dynamic and adaptable framework for AI safety certification, and include several key advancements. In particular, the training and use of a machine learning model to determine the relevancy of safety requirements to AI-based products automates a critical component of the safety assessment process. This automation extends to the assessment of the degree of conformance to these requirements and the assignment of relative weights based on their importance. By automating one or more of these functionalities, the embodiments eliminate the need for time-consuming manual reviews, which are not only resource-intensive but also prone to human error and variability in judgment. The machine learning model ensures that evaluations are conducted rapidly and with a high degree of accuracy, leveraging vast datasets to make informed determinations about relevancy and conformance. Additionally, by considering the relevancy of requirements, degree of conformance, and relative weights, the embodiments provide a more nuanced and comprehensive evaluation of AI safety. This thorough assessment captures aspects of safety that are overlooked in more simplistic or manual evaluation processes.

Further, the embodiments introduce a configurable safety threshold that can be adjusted based on the risk level associated with different types of AI-based products. This flexibility allows for a more nuanced evaluation of safety, where higher-risk products are subjected to more stringent safety criteria, and lower-risk products are assessed against a more lenient threshold. This adaptability is crucial for ensuring that the safety assessment process is both rigorous and relevant to the specific context in which an AI-based product operates. It addresses the challenge of applying a one-size-fits-all approach to safety certification, which does not adequately account for the diverse risk profiles of various AI applications.

By automating the evaluation process and introducing a configurable safety threshold, the embodiments enable the efficient and consistent evaluation of a wide range of AI-based products. This efficiency is particularly important given the vast and growing number of AI-based products being developed and deployed. The consistent application of safety standards is ensured through the use of standardized algorithms and criteria for determining relevancy, conformance, and weights, which are applied uniformly across all evaluations. This consistency is vital for maintaining the integrity of the safety certification process and ensuring that all AI-based products are assessed against the same high standards of safety and reliability.

Further, traditional manual assessments of AI safety are not scalable to the volume and variety of AI-based products entering the market. The automated and configurable nature of the embodiments directly addresses these scalability issues by enabling rapid, accurate, and standardized evaluations across a broad spectrum of AI-based products and technologies. This scalability ensures that safety assessments can keep pace with the rapid development of AI, facilitating timely certification and deployment of safe and reliable AI-based products.

Figure 1:
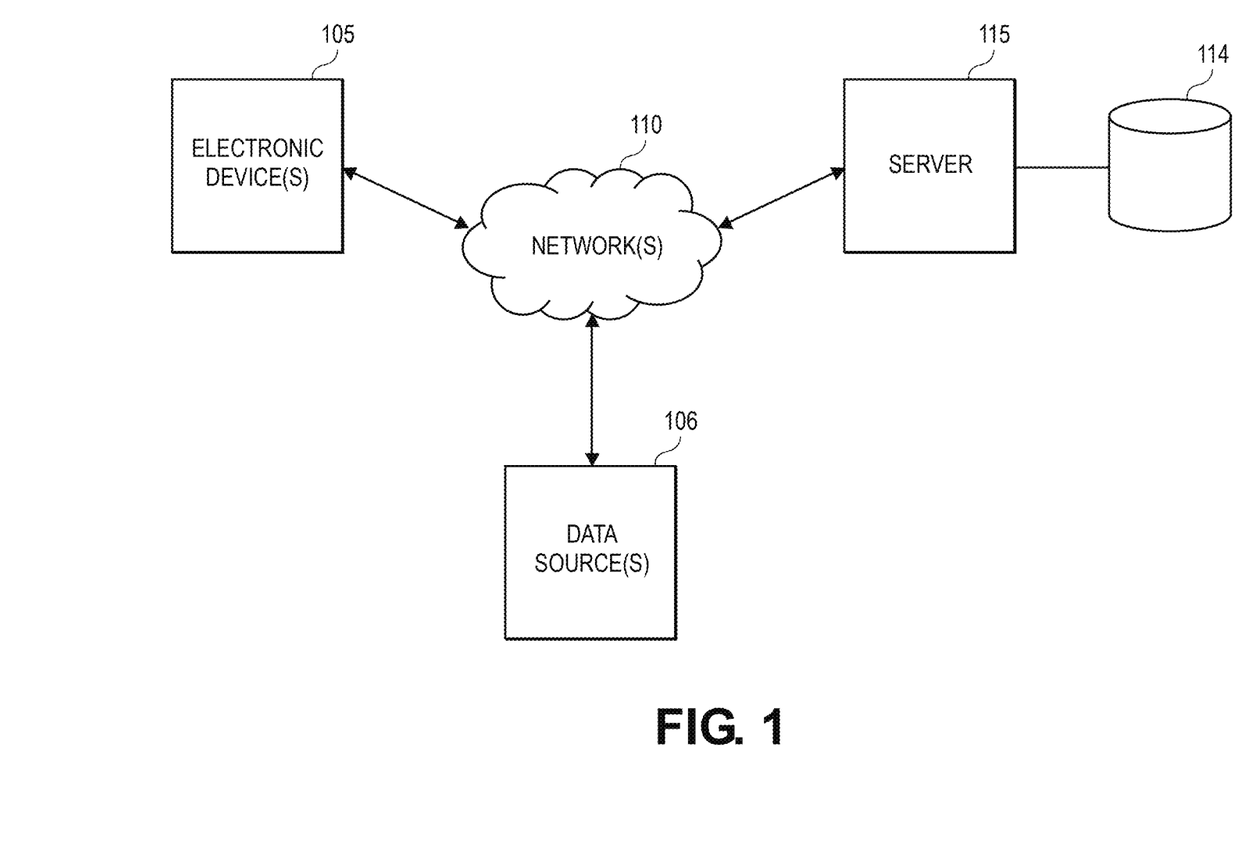
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a server 115 that may be communicatively connected to one or more networks 110. In embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

The server 115 may be associated with an entity (e.g., a corporation, company, partnership, or the like) that may be generally configured to automate the evaluation of AI-based products against AI safety principles and requirements. The server 115 may be configured to interface with or support a memory or storage 114 capable of storing various data, such as in one or more databases or other forms of storage. According to embodiments, the storage 114 may store data or information associated with AI safety principles and requirements thereof, training data for machine learning models, descriptions of AI-based products, and/or the like.

It should be appreciated that various types of AI-based products (i.e., equipment, devices, systems, or the like) are envisioned. For example, AI-based products may be related to appliances, autonomous driving, batteries, beauty and personal care, general components, consumer electronics, consumer packaged goods, furniture, general merchandise, HVAC/R, household and industrial cleaners, lighting, textiles, apparel and footwear, toys and children's products, water and plumbing, wire and cable, robotics, medical devices, and/or the like.

The server 115 may communicate, via the network(s) 110, with one or more data sources 106 that may be associated with AI safety. In embodiments, the data source(s) 106 may include an AI-based product database that may contain descriptions of AI-based products, including technical specifications, use cases, and information about the AI technologies they utilize; safety standards repositories that may store AI safety principles and requirements thereof, and standards documents applicable to AI technologies across various industries, including domestic and/or international standards, industry-specific safety guidelines, and ethical frameworks for AI; regulatory databases that may contain guidelines, regulations, and compliance requirements specific to AI safety across different jurisdictions; technical libraries that may contain technical papers, research studies, and expert analyses on AI safety, reliability, and ethical considerations, which can provide insights into best practices and emerging trends in AI safety evaluation; stakeholder feedback systems that may collect and store feedback from various stakeholders, including users, developers, and regulators, regarding the safety and performance of AI-based products; and/or other data sources.

According to embodiments, the server 115 may train and utilize a machine learning model to determine the relevancy of specific safety requirements of AI safety policies to a given AI-based product. The server 115 may additionally assess the degree of conformance of the AI-based product to these relevant requirements and assign relative weights to each requirement based on their importance in ensuring the safety of the AI-based product. Additionally, the server 115 may calculate an AI safety score for the AI-based product and determine, based on the calculated AI safety score, whether it meets a configurable safety threshold for certification, which is adjustable based on a risk level of the AI-based product. These features enable the server 115 to efficiently and consistently evaluate a wide range of AI-based products, ensuring their compliance with AI safety standards and facilitating their certification based on an objective and scalable methodology.

The server 115 may additionally communicate with a set of electronic device(s) 105 via the network(s) 110. According to embodiments, the server 115, upon completing the calculation of the AI safety score for a given AI-based product, may generate reports or notifications that encapsulate the findings of the AI safety assessment. A report may include an analysis of the relevancy of safety requirements, the degree of conformance of the AI-based product to these requirements, and the relative weights assigned to each requirement. Additionally, the report may indicate whether the AI-based product has met the configurable safety threshold and, consequently, whether it has achieved AI safety certification. Moreover, the report may include any recommendations for improvement or necessary actions to achieve certification Once the reports or notifications are generated, the server 115 may send the reports or notifications to the electronic device(s) 105, such as a computer, tablet, or smartphone, for review by a user associated with the AI-based product, for example a product developer, safety engineer, regulatory compliance officer, or any other stakeholder interested in the safety assessment outcome. Additional details regarding these functionalities is further discussed with respect to FIG. 2.

Although depicted as a single server 115 in FIG. 1, it should be appreciated that the server 115 may be in the form of a distributed cluster of computers, servers, machines, cloud-based services, or the like. In this implementation, the distributed server(s) 115 may be utilized as part of an on-demand cloud computing platform. Accordingly, when the electronic device(s) 105 interfaces with the server 115, the electronic device(s) 105 may actually interface with one or more of a number of distributed computers, servers, machines, or the like, to facilitate the described functionalities.

Generally, AI safety principles serve as foundational guidelines designed to ensure that AI technologies are developed, deployed, and utilized in a manner that prioritizes safety, reliability, ethical considerations, and compliance with regulatory standards. These principles exist to address the unique challenges and potential risks associated with AI systems, which can range from data privacy concerns and bias to unintended behaviors and ethical dilemmas. As AI technologies become increasingly integrated into various aspects of daily life and critical infrastructure—spanning healthcare, transportation, finance, and beyond—the need for comprehensive safety standards becomes paramount to prevent harm, protect individual rights, and maintain public trust in AI advancements.

AI safety principles may be underpinned by a set of specific requirements that operationalize these principles into actionable and measurable criteria. These requirements may detail the practical steps, methodologies, and standards that must be adhered to in order to align AI-based systems and products with the overarching safety principles. They serve as a concrete foundation upon which AI developers, regulators, and evaluators can base their assessments of AI technologies, ensuring that these systems are not only theoretically safe but also practically reliable and ethical in real-world applications.

The requirements associated with AI safety principles may cover various aspects of AI system development and deployment, thus providing a comprehensive checklist against which AI-based products can be evaluated, and enabling different facets of AI safety—from initial design through to deployment and beyond—to be systematically addressed.

One of the set of AI safety principles is quality management, which is a key component in the development of AI systems to minimize systematic errors and ensure that these systems meet their intended functional requirements. This involves applying structured methodologies throughout the software development lifecycle (SDLC), such as the V-Model, waterfall model, and others, to systematically verify and validate AI systems. By doing so, organizations can reduce the risk of failures and ensure reliable operation. The importance of integrating quality management practices from the initial design to the final testing phase is emphasized, aiming to produce AI systems that are robust, reliable, and fit for their intended purpose.

Referenced standards for quality management in AI systems include International Organization for Standardization (ISO)/International Electrotechnical Commission (IEC) 25059:2023, which outlines the Quality Model for AI Systems, and parts of IEC 61508 concerning software requirements and an overview of techniques and measures for functional safety. Key considerations involve designing for quality from the outset, utilizing a structured SDLC for rigorous definition and corresponding verification and validation activities, and implementing comprehensive testing strategies as guided by IEC 61508.

General guidelines in this safety principle suggest adopting structured SDLC frameworks like the V-Model, designing with quality in mind to create robust architectures, and developing a comprehensive testing framework that aligns with safety and performance aspects covered by IEC 61508. Specific requirements include designing AI systems with quality as a core principle, following a structured development process with detailed planning and verification at each phase, and undergoing rigorous testing at all levels to ensure compliance with quality and safety standards. These guidelines and requirements aim to enhance system reliability through fault tolerance, redundancy, error handling, and thorough documentation of design decisions and testing outcomes.

Another of the set of AI safety principles is robustness and reliability. These factors are important for the safety of AI-based products, ensuring consistent function under various conditions and accurate, dependable results over time. These principles relate to the ability of AI systems to handle unexpected situations without unintended outcomes. The assessment of robustness and reliability aims to make AI-based products resilient against errors, uncertainties, adversarial attacks, and data variations, maintaining safe performance in all foreseeable circumstances. Key considerations include error tolerance, adversarial resistance, data variation adaptability, and degradation management. General guidelines recommend stress testing, adversarial testing, variability testing, and longevity testing to evaluate AI systems' resilience and error-handling capabilities.

Requirements for data quality and diversity emphasize the need for accurate, consistent, complete, and relevant training data, covering a wide range of scenarios, demographic inclusivity, temporal diversity, and scenario coverage. Model stability and performance monitoring may involve ongoing evaluation using specific metrics and procedures for addressing performance degradation. Error handling and recovery mechanisms may involve robust processes for managing unexpected situations and data errors. Stress testing and adversarial attack resistance may involve techniques to uncover potential weaknesses and enhance model resistance. Validation and verification procedures may ensure that the AI model meets its intended functionality and safety requirements, including independent testing, formal verification techniques, and comparison with human expert decisions.

A further AI safety principle is transparency and explainability, which are important for fostering trust and understanding between AI-related products and their users, ensuring that the operations, decisions, and outputs of AI systems can be scrutinized. These principles aim to make AI systems accessible and comprehensible to a broad audience, including designers, developers, regulators, and end-users, by elucidating AI decision-making processes. This involves providing insights into data processing and decision-making, making AI systems more than just black boxes. Standards such as ISO/IEC 12792 and ISO/IEC 6254 guide the assessment of transparency and explainability in AI systems.

Key considerations may include making the AI decision-making process understandable, ensuring information accessibility, interpreting AI outputs, and maintaining traceability from input data through to final outputs. General guidelines emphasize the importance of clear documentation, user comprehension testing, algorithmic audits, and adherence to standards for transparency and explainability. Requirements may cover a range of areas from training and inference data handling, algorithm and model documentation, to detailing AI systems' capabilities, limitations, and risk mitigations. Guidelines suggest practices like providing clear data statements, implementing strong data protection measures, and ensuring comprehensive performance evaluations. Explainability is further detailed by requiring understandable explanations of model behavior, dynamic updates of feature importance, and context-specific explanations to cater to different stakeholder needs, highlighting the importance of making AI systems' workings clear for accountability and informed decision-making.

Further, control and oversight is another of the set of AI safety principles. Control and oversight mechanisms are important in AI systems to embed human values and ethical considerations, allowing for human intervention when necessary. These mechanisms may help ensure that AI-related products act in beneficial, non-harmful ways and maintain safety and reliability. The goal is to create a framework for AI-related products to operate under human supervision, with the ability to control, monitor, and correct AI actions. This may include real-time oversight, feedback, and intervention mechanisms to prevent AI systems from autonomously causing harm. Control and oversight are important for safe, ethical operation under human supervision, aligning AI systems with human values and ethical standards. Standards such as ISO/IEC 8200 and ISO/IEC 42105 may guide the controllability and human oversight of AI systems.

Key considerations include Human-in-the-Loop (HITL) mechanisms, intervention mechanisms, continuous monitoring and reporting, and clear responsibility and accountability lines. General guidelines suggest system audits, scenario-based testing, real-time monitoring capabilities, and accountability framework reviews. Requirements may cover user interfaces for control and overriding AI decisions, processes for human intervention in critical situations, alerting mechanisms for when intervention is needed, and granular access controls to manage modifications or disable AI functionality. These elements ensure AI systems are designed and operated with robust frameworks for control and oversight, safeguarding against unintended consequences and maintaining trust between AI systems and human users.

A further AI safety principle is fairness and bias, which are important principles in ensuring AI-related products operate equitably, without discrimination or prejudice towards any individual or group. Bias in AI can arise from training data or design choices, leading to systematic preferences that must be identified and mitigated. The goal is to develop AI systems that are free from unfair biases, ensuring equitable outcomes for all users by examining and correcting datasets, algorithms, and operational methodologies. Addressing fairness and bias involves a proactive approach throughout the AI system's lifecycle, from data collection to deployment, prioritizing fairness to benefit all individuals and communities equitably. Standards like ISO/IEC 24027:2021 and ISO/IEC 24028:2020 guide the assessment of bias and trustworthiness in AI.

Key considerations may include bias detection and mitigation, ensuring equitable outcomes, using diverse training data, and maintaining transparency in decision-making. General guidelines recommend bias audits, diversity analysis of training data, impact assessments, and algorithmic transparency reviews. Requirements may cover bias identification techniques, implementing bias mitigation strategies, and conducting fairness testing to assess AI model performance across diverse user groups, helping to ensure the AI system's outputs are consistent and fair for different demographics.

A further of the AI safety principles is data privacy, which focuses on the responsible management of personal information in compliance with regulations like the European Union (EU) General Data Protection Regulation (GDPR). It helps ensure that AI-related products protect sensitive data and respect individual privacy rights. This safety principle highlights the importance of data privacy in AI systems, emphasizing the need for rigorous governance, collection, storage, use, and sharing of personal data.

Key considerations include data minimization, obtaining consent, anonymizing data, and ensuring robust data security measures. General guidelines suggest conducting Privacy Impact Assessments (PIAs), compliance audits, and integrating data protection by design. Requirements may cover explicit consent for data collection, secure data storage with strict access controls, transparent data usage and sharing policies, clear data retention and deletion protocols, and adherence to privacy regulations and standards. These measures aim to uphold the highest standards of data protection and privacy in AI systems, ensuring equitable and non-harmful operations towards individuals and organizations.

An additional AI safety principle is risk management. An AI system may be required to implement a comprehensive risk management framework, adhering to guidelines and best practices such as those outlined in the National Institute of Standards and Technology (NIST) AI Risk Management Framework (AI RMF 1.0). This framework may facilitate identifying, assessing, mitigating, and monitoring risks throughout the AI lifecycle, enhancing the safety, reliability, and trustworthiness of AI-based products. The risk management process may be divided into different categories such as risk identification, risk assessment, risk mitigation, and risk monitoring and review, with each category having specific requirements and guidelines. For risk identification, AI system providers may define the operational context and identify potential risk sources. Risk assessment may involve analyzing identified risks for their likelihood and impact, such as by utilizing both qualitative and quantitative methods to prioritize risks.

In risk mitigation, appropriate controls may be identified and implemented to mitigate risks, with their effectiveness tested and validated. Further, risk monitoring and review may have establishes processes for continuous monitoring of risk indicators and the effectiveness of risk controls, with periodic reviews and updates to the risk management framework to adapt to new threats and changes. Standards such as ISO/IEC 42001:2023 and ISO/IEC 23894:2023, along with NIST guidelines, may provide the normative references for this comprehensive approach to risk management in AI systems.

Another AI safety principle is AI-based functional safety. The integration of AI in functional safety across sectors like automotive, industrial automation, healthcare, and aerospace may be subject to consideration due to AI's adaptive and non-deterministic nature. ISO/IEC 5469 provides guidance on incorporating AI into safety systems, emphasizing the need for AI functions to behave predictably and safely, especially in fault conditions, and detailing the requirements and guidelines for safely using AI within safety systems, ensuring AI components operate reliably and meet safety-critical standards. This section additionally covers risk identification and assessment for AI integration, functional safety classification for AI components, designing for safe AI integration in safety systems, verification and validation of AI in safety systems, and monitoring and updating AI components.

Requirements may include comprehensive hazard analysis, assigning functional safety levels, integrating AI with safety mechanisms like fail-safe designs, and rigorous validation and verification processes. Guidelines suggest using established methodologies for risk assessment, employing redundancy and fault-tolerant designs, implementing real-time monitoring, and regularly updating AI models to ensure ongoing compliance with safety requirements. This approach aims to maintain the safety and reliability of AI-based products without compromising functional safety.

A further AI safety principle is data management. Generally, data collection and analysis play a role in ensuring the safety, reliability, and ethical integrity of AI-based products. This involves systematically gathering, evaluating, and interpreting data to train, validate, and improve AI systems continuously. Best practices and methodologies for effective data management may emphasize the importance of high-quality, diverse, and ethically sourced data.

Key considerations may include ensuring data quality and integrity, diversity and representativeness, adherence to data privacy and security regulations, ethical data sourcing, and continuous monitoring and updating of data sets. By developing a data governance framework, conducting regular data audits, implementing data augmentation when necessary, fostering transparency in data use, incorporating external data reviews, and engaging in cross-disciplinary data assessments, AI systems may maintain robust data collection and analysis practices. These practices support the development of AI systems that are safe, reliable, and ethical, adhering to guidelines such as those outlined in the NIST AI Risk Management Framework and relevant ISO/IEC standards.

An additional AI safety principle is documentation and reporting, which may emphasize the importance of maintaining detailed records and reports throughout the development, deployment, and monitoring phases of AI-based products. Such documentation may be used to ensure transparency, accountability, and compliance with ethical and regulatory standards.

Key considerations include making documentation clear and accessible to all stakeholders, covering all aspects of the AI system's lifecycle, regularly updating documents to reflect the latest developments, and adhering to compliance and ethical standards. AI systems may maintain records of the design process, data collection and analysis activities, testing and evaluation procedures, compliance checks, deployment logs, and incident responses. These records should document key design decisions, data processing activities, performance benchmarks, compliance and ethical reviews, deployment configurations, and responses to any incidents. Guidelines suggest reviewing documentation for completeness and clarity, conducting periodic audits to ensure documentation is current and accurate, and assessing the effectiveness of data quality, diversity checks, and incident response procedures. By adhering to these practices, AI-based products can support robust documentation and reporting practices that enhance transparency, accountability, and compliance with standards and regulatory requirements.

Finally, the set of AI safety principles includes lifecycle management which is important for maintaining their safety, reliability, and effectiveness over time. ISO/IEC 5338 offers a framework for managing the AI system lifecycle, incorporating AI-specific adaptations alongside traditional processes. This management may span from design and development to deployment, operation, and eventual decommissioning, ensuring AI products adapt to technological, regulatory, and user changes while maintaining compliance.

Key considerations include continuous monitoring and updating, adaptability to changes, and planning for end-of-life to mitigate residual risks. Guidelines suggest periodic reviews, version control, and stakeholder engagement to address needs and concerns effectively. During the development phase, AI systems may establish processes that consider risks, ethics, and stakeholder input, ensuring thorough testing and validation. The deployment phase may involve controlled processes with user documentation and training for safe use. Operation and maintenance may require continuous monitoring and regular updates to uphold reliability and safety. Finally, decommissioning involves plans for data handling, risk mitigation, and safe disposal or repurposing of components, helping ensure activities comply with regulations and are conducted safely.

Figure 2:
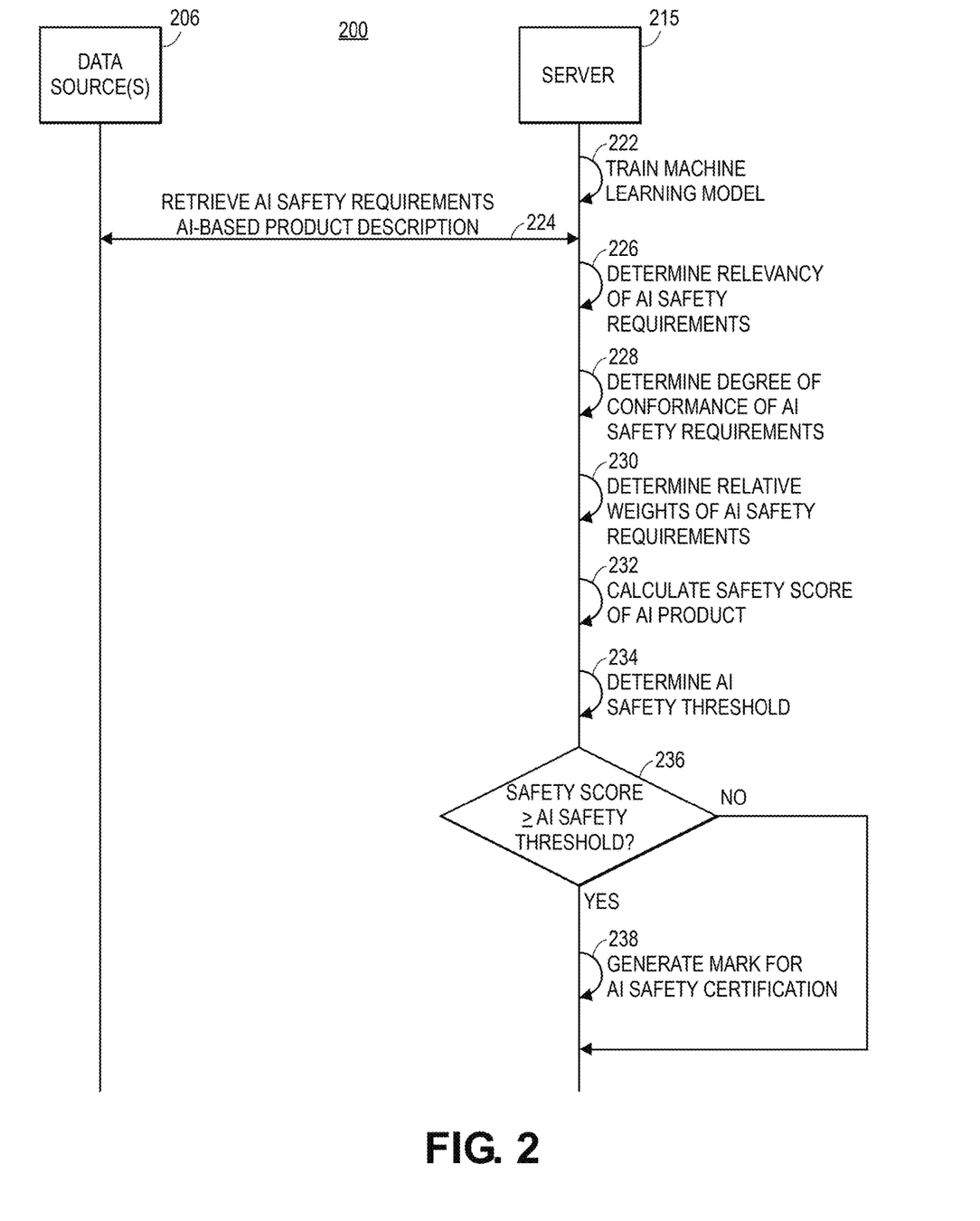
FIG. 2 depicts an example signal diagram detailing assessing AI safety scores for AI-based products, in accordance with some embodiments.

FIG. 2 depicts a signal diagram 200 including various functionalities associated with the described embodiments. The signal diagram 200 may include a server 215 (such as the server 115 as described with respect to FIG. 1), and a data source(s) 206 (such as the data source(s) 106 as described with respect to FIG. 1, or another data source).

The signal diagram 200 may begin at 222 in which the server 215 trains, using a training dataset, a machine learning model related to assessing AI safety for AI-related products. In particular, the server 215 may use the machine learning model or large language model (LLM) to determine the relevancy of safety requirements, of the set of AI safety principles, for the AI-related products. In embodiments, the training dataset may include a diverse collection of descriptions associated with AI-related products, where these descriptions may be paired with direct and indirect annotations that indicate the relevancy of each of the AI system safety principles to the corresponding AI-related products.

In particular, the descriptions of the AI-based products may include information about their functionalities, intended use cases, and the technologies they employ (e.g., ML, DL, GenAI), and/or other information. These descriptions may be sourced from product manuals, technical specifications, marketing materials, and/or other relevant documentation.

Each AI-based product description may be labeled or annotated with a binary value indicating the relevancy of each requirement of each of the set of AI safety principles, such as based on a set of guidelines that may include examples of product features or functionalities that would make a particular requirement relevant, as well as criteria for deeming a requirement not relevant. In particular, for each AI-based product description, the relevancy of each requirement of each AI safety principle is assessed based on the set of guidelines, including whether that principle applies to the technology, use case, and/or potential safety risks of the AI-based product being assessed, and each requirement of each AI safety principle may be annotated with a binary value for the product description: 1 (relevant) if the requirement based on the set of guidelines, or 0 (not relevant) if it does not. The resulting labeled or annotated dataset may constitute the training dataset.

To train the machine learning model, the server 215 may analyze the text of the AI-based product descriptions to identify key features and patterns that correlate with the relevancy of different requirements of different AI safety principles. This may involve natural language processing (NLP) techniques such as tokenization, stemming, and the use of word embeddings to capture the semantic meaning of the text. The server 215 may employ a supervised learning algorithm, such as a deep neural network or a support vector machine, to learn the relationship between the features extracted from the AI-based product descriptions and the annotated relevancy of requirements of AI safety principles. The model may adjust its parameters to minimize the difference between its predictions and the actual annotations in the training dataset. Further, the server 215 may validate and test the trained machine learning model using a separate portion of the training dataset not seen during training, which may evaluate the accuracy of the machine learning model in predicting the relevancy of requirements of AI safety principles for new, unseen AI-based product descriptions.

In embodiments, the server 215 may employ a self-supervised learning algorithm (e.g., transformer) to train the machine learning model, such as with training data that is not labeled, to learn any relationship between features extracted from the AI-based product description and a relevancy of requirements of the AI safety principles. In particular, the server 215 may train the machine learning model to infer a relevancy of each requirement of the set of AI safety principles without explicitly labeled data. Instead of relying on pre-annotated binary values indicating the relevancy of safety requirements, the machine learning model may leverage patterns, relationships, and contextual cues found within the AI-based product descriptions and any associated safety documentation or other information. By analyzing this related training content, the machine learning model may learn to recognize features, functionalities, and contextual factors that may imply the applicability of specific safety requirements to different AI-based products. For example, the machine learning model may identify textual patterns or semantic similarities between product descriptions and the descriptions of safety requirements, enabling it to predict the relevancy of each requirement based on any inherent characteristics of the AI-based product being assessed. This self-supervised approach may enable the machine learning model to dynamically adapt to new information and refine its understanding of relevancy criteria, thereby facilitating a continuous improvement of its predictive accuracy without the need for manually-labeled training datasets.

The server 215 may retrieve (224) information associated with requirements for the set of AI safety principles, as well as a description for an AI-based product. In embodiments, the server 215 may already have access to the some or all of this information, such as if the information is locally stored. Further, in embodiments, the description for the AI-based product may include various information such as: a product overview (e.g., a general introduction to the product, including its name, purpose, and the primary problem it aims to solve); functionalities and features (e.g., information about what the product does, including its key functionalities and features, and describes how the product uses AI to perform tasks, make decisions, or provide insights); AI technologies employed (e.g., an explanation of the specific AI technologies that power the product, such as ML, DL, GenAI, or LLMs); use cases (e.g., descriptions of the intended use cases for the product, illustrating how it is expected to be used in real-world scenarios); user interaction (e.g., information on how users interact with the product, including any user interfaces (UI), voice or gesture controls, feedback mechanisms, and user experience (UX) considerations); data handling and privacy (e.g., details on how the product collects, processes, and stores data, including user data); safety and ethical considerations (e.g., an overview of any safety features integrated into the product to mitigate risks associated with its operation, as well as ethical considerations, such as fairness, bias, and transparency, and how the product addresses these issues); technical specifications (e.g., technical details about the product, including hardware requirements, software compatibility, and performance metrics); and/or other information.

At 226, the server 215 may use the trained machine learning model to determine a relevancy, to the AI-based product, of each requirement included in each of the AI safety principles. In particular, the trained machine learning model may analyze the description of the AI-based product by processing the underlying text to understand its content and context, to determine the relevancy of each requirement of each AI safety principle to the AI-based product.

Initially, the machine learning model may examine the product description, utilizing NLP techniques to extract features such as keywords, phrases, and semantic structures that indicate the functionalities, use cases, and the employed technologies of the AI-based product. This analysis may help the machine learning model to grasp the scope and specific aspects of the AI-based product that may relate to various safety principles, such as data privacy, lifecycle management, or fairness and bias.

For each AI safety principle, the machine learning model may assess the extracted features against the training dataset that includes examples of product descriptions with annotated relevancies for the requirements of that principle. This training dataset may enable the machine learning model to learn patterns and correlations between product characteristics and the applicability of each requirement. Based on this learned knowledge, the machine learning model may predict whether a given requirement is relevant (1) or not relevant (0) to the AI-based product, which may involve evaluating the similarity between the feature(s) of the AI-based product and the features of products in the training dataset that are known to be relevant or not relevant to each requirement.

The output of the machine learning model for each requirement of each AI safety principle maybe a binary value. A value of "1" indicates that, according to the analysis of the machine learning model, the requirement is relevant to the AI-based product, suggesting that the description of the AI-based product contains elements or characteristics that align with the considerations of that requirement. Conversely, a value of "0" suggests that the requirement is deemed not relevant to the AI-based product, implying that the description of the AI-based product lacks elements that would necessitate consideration under that specific safety principle.

At 228, the server 215 may determine or access a degree of conformance, to the AI-based product, of each requirement included in each of the AI safety principles. In embodiments, the degree of conformance may be determined for each requirement that is determined, in 226, to be relevant to the AI-based product.

The degree of conformance for each relevant requirement of an AI safety principle may be quantified on a scale from 0 to 1, and may be determined through an assessment that evaluates how well the AI-based product aligns with the specified requirement. This may involve a combination of automated analysis and expert evaluation to accurately gauge conformance. In particular, the server 215 may employ an automated algorithm (e.g., an LLM) to scan the description of the AI-based product and/or any available documentation or technical specifications, such as to identify specific indicators, keywords, or phrases that suggest conformance with the requirements.

Additionally or alternatively, an individual (e.g., an expert in AI safety, ethics, and relevant technical domains) may review the findings to provide a more nuanced assessment, such as by considering the context in which the AI-based product operates, the technologies it employs, and any documented evidence of compliance practices or safety measures that the AI-based product incorporates.

The server 215 may determine the degree of conformance based on any combination of the insights from the automated analysis and individual evaluation. A degree of conformance close to one (1) may indicate that the AI-based product closely aligns with the requirement, demonstrating clear evidence of compliance or implementation of the safety principle in question. Conversely, a degree of conformance closer to zero (0) may suggest that the AI-based product falls short of meeting the requirement, either due to lack of evidence, insufficient implementation of safety measures, or practices that do not fully align with the stipulations of the requirement. It should be appreciated that the conformance assessment functionalities may be performed autonomously and without human intervention by the server 215.

At 230, the server 215 may determine relative weights for the requirements included in each of the AI safety principles. In embodiments, a relative weight may be determined for each requirement that is determined, in 226, to be relevant to the AI-based product.

In embodiments, the weight assigned to a given requirement may reflect its importance in ensuring the safety of the AI-based product and may be determined according to various factors. This may involve input from experts in AI safety, ethics, and the specific domain to which the AI-based product belongs, as well as an analysis of the AI-based product's operational context and the potential impact of each requirement on overall safety. In particular, an individual (e.g., a safety expert) may review the nature of the AI-based product, including its functionalities, use cases, and the environments in which it operates, such as to help identify which safety principles and corresponding requirements are most critical or relevant to the safe and ethical deployment of the product. For instance, a requirement related to data privacy might carry more weight for an AI-based product that handles sensitive personal information, while a requirement pertaining to robustness and reliability might be more significant for products used in safety-critical applications.

Additionally, the evaluation process may consider a potential consequence(s) of non-compliance with each requirement. Requirements that, if not met, could lead to significant safety risks, legal issues, or ethical concerns may be assigned higher weights, indicating their greater importance in the context of the safety assessment of the AI-based product. The assignment of weights may additionally or alternatively be informed by regulatory standards, industry best practices, and historical data on safety incidents related to similar products. This information may provide a benchmark for determining the relative importance of each requirement based on established safety norms and the experiences of other products in the field. It should be appreciated that the weight assignment functionalities may be performed autonomously and without human intervention by the server 215.

Based on consideration of these factors, the server 215 may calculate a weight for each requirement, such as with a value that ranges from zero (0) to one (1). In embodiments, higher values may be assigned to requirements that are deemed more critical to the safety of the AI-based product, reflecting their priority in the safety assessment process. Similarly, lower values may be assigned to requirements that are deemed less critical to the safety of the AI-based product. In this regard, the safety score calculation more accurately represent compliance of the AI-based product with the most impactful safety requirements, facilitating a targeted and effective evaluation of the safety profile of the AI-based product.

At 232, the server 215 may calculate an AI safety score for the AI-based product. Generally, the server 215 may calculate the AI safety score for the AI-based product based on a combination of the relevancy of the requirements for the AI-based products, the degree(s) of conformance of the requirement(s) (in particular, those requirements that are deemed as relevant to the AI-based product), and the relative weight(s) of the requirement(s) (in particular, those requirements that are deemed as relevant to the AI-based products).

According to an embodiment, the following notations may be used in the calculation of the AI safety score. In particular, the requirements may be notated as: $i=1, 2, 3, \ldots, N$; the relative weight(s) of the requirement(s) may be notated as: $w_i \in \mathbb{R}$, $0 \leq w_i \leq 1$; the relevancy of the requirements may be notated as: $R_i \in \{0,1\}$; and the degree(s) of conformance may be notated as: $C_i \in \mathbb{R}$, $0 \leq C_i \leq 1$. In this regard, the server 215 may calculate the overall score according to equation (1):

$$\text{Overall Safety Score: } s = \frac{\sum_{i=1}^{N} w_i R_i C_i}{\sum_{i=1}^{N} w_i R_i} = [0, 1] \quad (1)$$

At 234, the server 215 may determine an AI safety threshold for the AI-based product. Generally, the AI safety threshold may be the minimum AI safety score that an AI-based product must achieve to be considered safe and eligible for certification. The AI safety threshold may be configurable or dynamically determined based on a risk level associated with the AI-based product, which may accommodate different AI applications posing varying degrees of risk to users, society, and the environment.

For instance, for AI-based products that may have detrimental impact on the health, safety, or fundamental right(s) of a person, the AI safety threshold may be set higher (e.g., $S \geq 0.9$); for AI-based products that may interact with human, emotional recognition systems, biometric categorization, or generate or manipulate image, audio or, video content, the AI safety threshold may be set a medium/high amount (e.g., $S \geq 0.7$); and for other AI-based products that do not apply to these criteria, the AI safety threshold may be set lower (e.g., $S \geq 0.5$).

It should be appreciated that other thresholds and criteria for the thresholds are envisioned, where the criteria and the thresholds for the criteria are configurable. For example, criteria for a higher AI safety threshold may include AI-based products used in healthcare diagnostics, autonomous vehicles, or financial decision-making systems; and criteria for a lower AI safety threshold may include AI-based products associated with entertainment or non-critical informational tools. By basing the AI safety threshold on the risk level of the AI-based product, the evaluation is more adaptable and relevant to the specific context in which the AI-based product operates. This approach may help ensure that safety assessments are proportionate to the potential impact of the AI-based product, facilitating the responsible development and deployment of AI technologies across a wide range of applications.

At 236, the server 215 may determine whether the calculated AI safety score for the AI-based product at least meets the AI safety threshold for the AI-based product (i.e., based on its risk level). If the calculated AI safety score meets or exceeds the AI safety threshold, it may indicate that the AI-based product has adhered to the necessary safety standards and requirements, demonstrating a level of safety and reliability deemed acceptable for its risk category. If the calculated AI safety score for the AI-based product does not meet the AI safety threshold ("NO"), processing may end, repeat, or proceed to another functionality.

If the calculated AI safety score for the AI-based product does at least meet the AI safety threshold ("YES"), the AI-based product may be deemed as eligible for certification. This certification process may involve the generation of a mark for AI safety certification, thus symbolizing the compliance of the AI-based product with established AI safety principles and its commitment to upholding high safety standards. The server 215 may create (238) the certification mark and record it in a certification database, and generate a certification report or notification that includes the mark. The server 215 may transmit this report or notification to an electronic device for review by a stakeholder(s), such as developers, regulators, or users. The AI safety certification mark may serve as a tangible acknowledgment of the safety evaluation of the AI-based product, which may provide assurance to the stakeholder(s) of the safety integrity of the AI-based product, and facilitate trust in its deployment and use.

Figure 3:
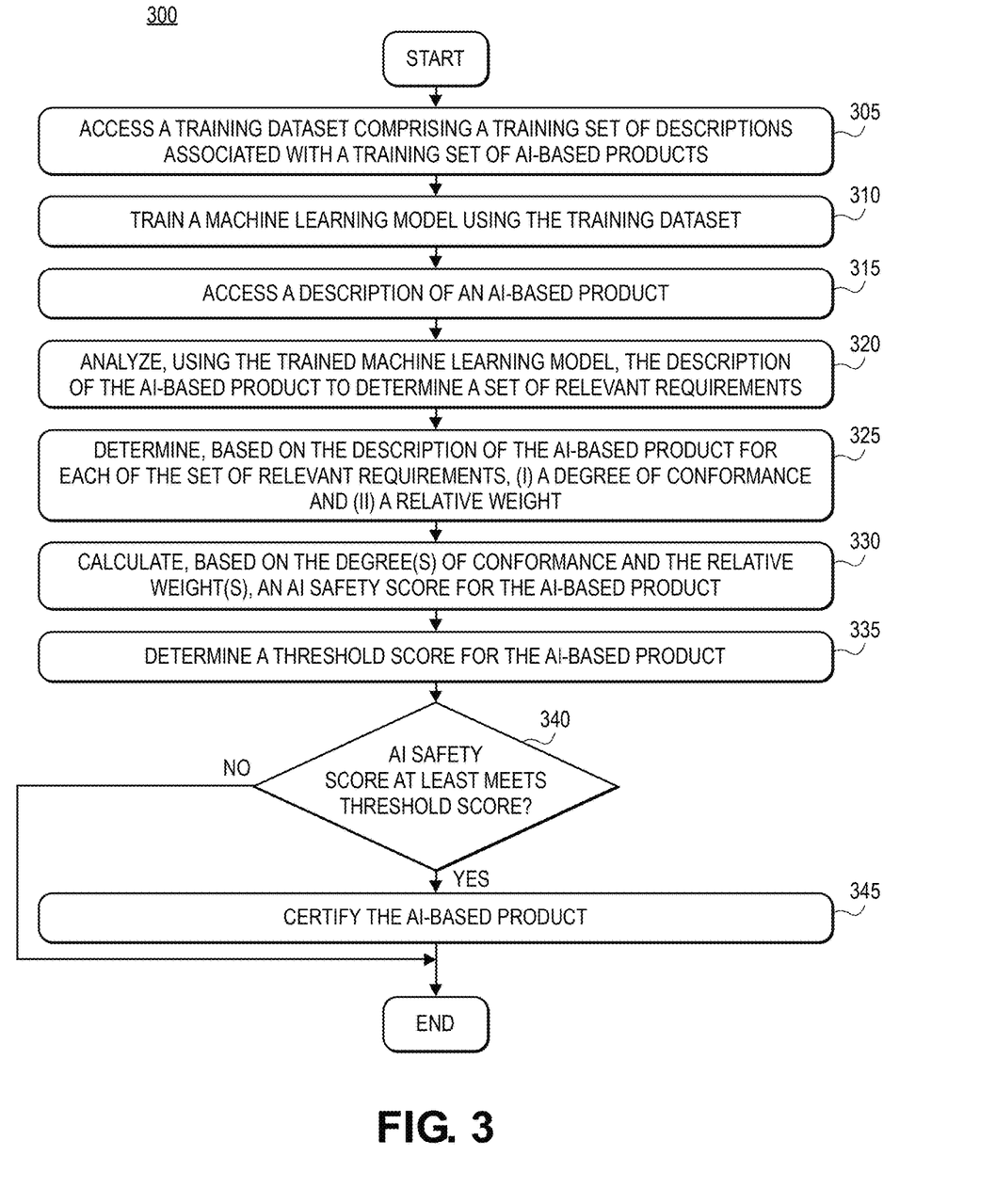
FIG. 3 illustrates an example flow diagram of assessing AI safety scores for AI-based products according to a plurality of AI safety principles, in accordance with some embodiments.

FIG. 3 is a block diagram of an example method 300 of assessing AI safety scores for AI-based products according to a plurality of AI safety principles, wherein each of the plurality of AI safety principles has a set of requirements associated therewith. The method 300 may be facilitated by one or more computers (such as the server 115, 215 as described with respect to FIGS. 1 and 2).

The method 300 may begin when the computer accesses (block 305) a training dataset comprising a training set of descriptions associated with a training set of AI-based products. In embodiments, for each AI-based product in the training set of AI-based products, the training dataset may be labeled with a binary value indicating a relevancy of each requirement of the set of requirements for each AI safety principle of the plurality of AI safety principles.

The computer may train (block 310) a machine learning model using the training dataset. Further, the computer may access (block 315) a description of an AI-based product. After the machine learning model is trained, the computer may analyze (block 320), using the trained machine learning model, the description of the AI-based product to determine a set of relevant requirements, of the set of requirements for each of the plurality of AI safety principles, wherein each of the set of relevant requirements is determined to be relevant to the AI-based product. In embodiments, in analyzing the AI-based product description, the machine learning model may output a binary value for each of the set of requirements for each of the plurality of AI safety principles, wherein a binary value of one (1) indicates that that requirement is a relevant requirement.

The computer may determine (block 325), based on the description of the AI-based product by the at least one computer processor for each of the set of relevant requirements, (i) a degree of conformance to that relevant requirement, and (ii) a relative weight of that relevant requirement. In embodiments, each of the degree of conformance and the relative weight may be between zero (0) and one (1).

The computer may calculate (block 330), based on the degree of conformance to each of the set of relevant requirements and the relative weight of each of the set of relevant requirements, an AI safety score for the AI-based product. In embodiments, the computer may calculate the AI safety score based on (i) a summation of a product of the degree of conformance to each of the set of relevant requirements and the relative weight of each of the set of relevant requirements divided by (ii) a summation of the relative weight of each of the set of relevant requirements.

The computer may determine (block 335) a threshold score for the AI-based product. In embodiments, the computer may initially determine a risk level of the AI-based product, and then determine, based on the risk level of the AI-based product, the threshold score. The computer may determine (block 340) whether the AI safety score at least meets the threshold score. If the AI safety score does not at least meet the threshold score ("NO"), processing may repeat, end, or proceed to other functionality.

If the AI safety score does meet the threshold score ("YES"), the computer may certify (block 345) the AI-based product In embodiments, the computer may generate a mark for AI safety certification for the AI-based product.

Figure 4:
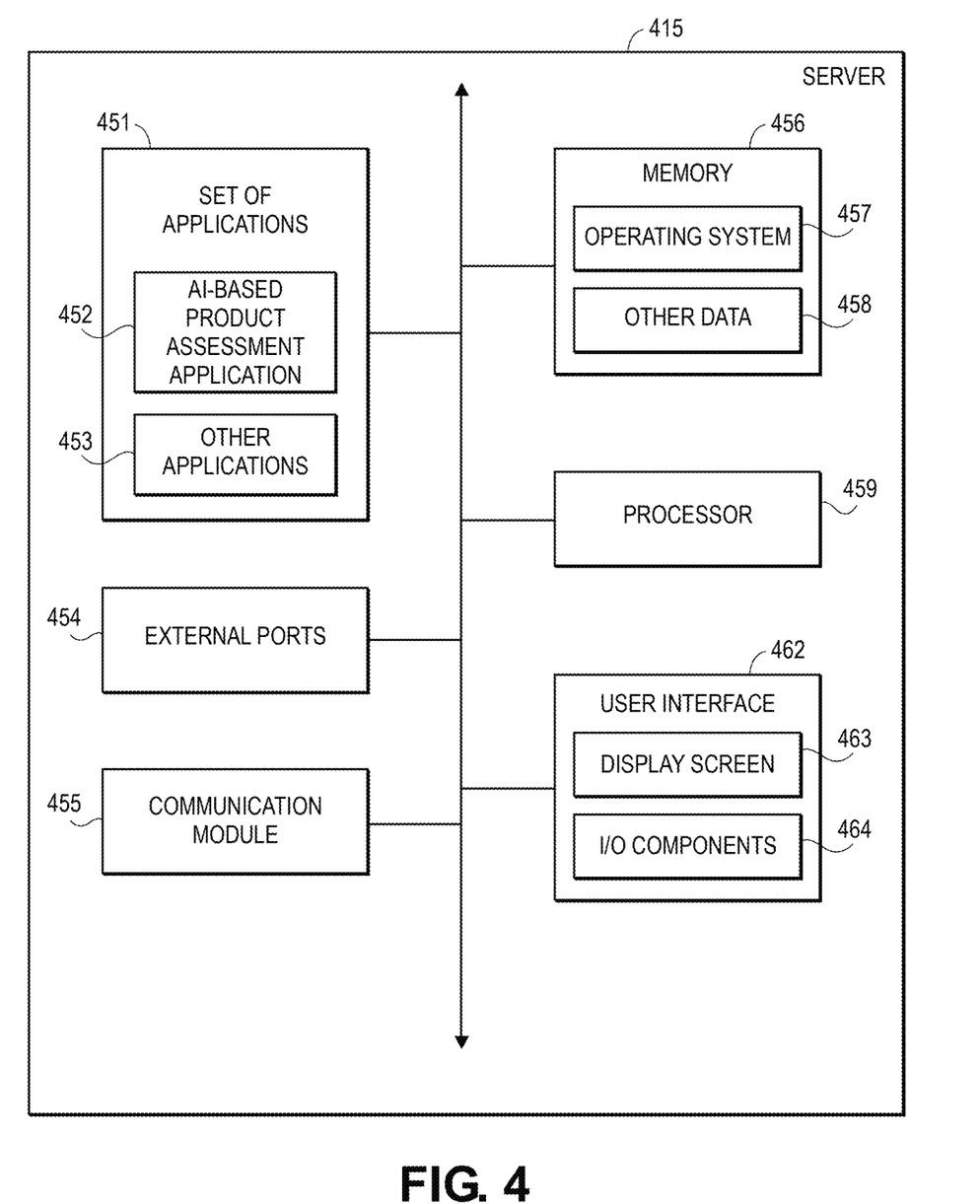
FIG. 4 is an example hardware diagram of a server configured to perform various functionalities, in accordance with some embodiments.

FIG. 4 illustrates a hardware diagram of an example server 415 (e.g., the server 115 as described with respect to FIG. 1), in which the functionalities as discussed herein may be implemented. It should be appreciated that the components of the server 415 are merely exemplary, and that additional or alternative components and arrangements thereof are envisioned.

The server 415 may include a processor 459 as well as a memory 456. The memory 456 may store an operating system 457 capable of facilitating the functionalities as discussed herein as well as a set of applications 451 (i.e., machine readable instructions). For example, one of the set of applications 451 may be an AI-based product assessment application 452, such as to analyze and assess AI-based product safety certification. It should be appreciated that one or more other applications 453 are envisioned.

The processor 459 may interface with the memory 456 to execute the operating system 457 and the set of applications 451. According to some embodiments, the memory 456 may also store other data 458, such as machine learning model data that may be used in the analyses and determinations as discussed herein. The memory 456 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 415 may further include a communication module 455 configured to communicate data via the one or more networks (not shown in FIG. 4). According to some embodiments, the communication module 455 may include one or more transceivers (e.g., WAN, WWAN, WLAN, and/or WPAN transceivers) functioning in accordance with IEEE standards, 3GPP standards, or other standards, and configured to receive and transmit data via one or more external ports 454.

The server 415 may further include a user interface 462 configured to present information to a user and/or receive inputs from the user. As shown in FIG. 4, the user interface 462 may include a display screen 463 and I/O components 464 (e.g., ports, capacitive or resistive touch sensitive input panels, keys, buttons, lights, LEDs, external or built in keyboard). According to some embodiments, the user may access the server 415 via the user interface 462 to review information, make selections, and/or perform other functions.

In some embodiments, the server 415 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 459 (e.g., working in connection with the operating system 457) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the preceding and following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of assessing artificial intelligence (AI) safety scores for AI-based products according to a plurality of AI safety principles, wherein each of the plurality of AI safety principles has a set of requirements associated therewith, the computer-implemented method comprising:

accessing, by at least one computer processor, a training dataset comprising a training set of descriptions associated with a training set of AI-based products;

training, by the at least one computer processor, a machine learning model using the training dataset, wherein the at least one computer processor trains the machine learning model to infer a relevancy of each requirement of the plurality of AI safety principles by analyzing at least one of patterns, relationships, or contextual clues found within the training set of descriptions associated with the training set of AI-based products to recognize at least one of a feature, a functionality, or a contextual factor that implies the relevancy of that requirement to one or more of the training set of AI-based products;

accessing, by the at least one computer processor, a description of an AI-based product;

analyzing, using the trained machine learning model by the at least one computer processor, the description of the AI-based product to determine a set of relevant requirements, of the set of requirements for each of the plurality of AI safety principles, wherein each of the set of relevant requirements is determined to be relevant to the AI-based product;

determining, based on the description of the AI-based product by the at least one computer processor for each of the set of relevant requirements, (i) a degree of conformance to that relevant requirement, and (ii) a relative weight of that relevant requirement;

calculating, by the at least one computer processor based on the degree of conformance to each of the set of relevant requirements and the relative weight of each of the set of relevant requirements, an AI safety score for the AI-based product;

determining, by the at least one computer processor, that the AI safety score at least meets a threshold score;

in response to determining that the AI safety score at least meets the threshold score, certifying the AI-based product; and generating, by the at least one processor, a report communicated to a user electronic device, the report indicating at least one of the AI safety score, a certification of the AI-based product, or a recommendation for improvement or an action to achieve certification if not certified.

2. The computer-implemented method of claim 1, further comprising:

determining, by the at least one computer processor, a risk level of the AI-based product; and determining, by the at least one computer processor based on the risk level of the AI-based product, the threshold score.

3. The computer-implemented method of claim 1, wherein calculating the AI safety score for the AI-based product comprises:

calculating, by the at least one computer processor, the AI safety score based on (i) a summation of a product of the degree of conformance to each of the set of relevant requirements and the relative weight of each of the set of relevant requirements divided by (ii) a summation of the relative weight of each of the set of relevant requirements.

4. The computer-implemented method of claim 1, wherein analyzing the description of the AI-based product to determine the set of relevant requirements comprises:

analyzing, using the trained machine learning model by the at least one computer processor, the description of the AI-based product; and based on analyzing the description of the AI-based product, outputting, by the trained machine learning model, a binary value for each of the set of requirements for each of the plurality of AI safety principles, wherein a binary value of one (1) indicates that the requirement is a relevant requirement.

5. The computer-implemented method of claim 1, wherein determining, based on the description of the AI-based product by the at least one computer processor for each of the set of relevant requirements, the degree of conformance to that relevant requirement comprises:

determining, based on the description of the AI-based product by the at least one computer processor for each of the set of relevant requirements, the degree of conformance to that relevant requirement, wherein the degree of conformance is between zero (0) and one (1).

6. The computer-implemented method of claim 1, wherein determining, based on the description of the AI-based product by the at least one computer processor for each of the set of relevant requirements, the relative weight of that relevant requirement comprises:
determining, based on the description of the AI-based product by the at least one computer processor for each of the set of relevant requirements, the relative weight of that relevant requirement, wherein the relative weight is between zero (0) and one (1).

7. A system for assessing artificial intelligence (AI) safety scores for AI-based products according to a plurality of AI safety principles, wherein each of the plurality of AI safety principles has a set of requirements associated therewith, the system comprising:
a memory storing a set of computer-readable instructions and a machine learning model; and
at least one computer processor interfaced with the memory, and configured to execute the set of computer-readable instructions to cause the at least one computer processor to:
access a training dataset comprising a training set of descriptions associated with a training set of AI-based products,
train the machine learning model using the training dataset to infer a relevancy of each requirement of the plurality of AI safety principles by analyzing at least one of patterns, relationships, or contextual clues found within the training set of descriptions associated with the training set of AI-based products to recognize at least one of a feature, a functionality, or a contextual factor that implies the relevancy of that requirement to one or more of the training set of AI-based products,
access a description of an AI-based product,
analyze, using the trained machine learning model, the description of the AI-based product to determine a set of relevant requirements, of the set of requirements for each of the plurality of AI safety principles, wherein each of the set of relevant requirements is determined to be relevant to the AI-based product,
determine, based on the description of the AI-based product for each of the set of relevant requirements, (i) a degree of conformance to that relevant requirement, and (ii) a relative weight of that relevant requirement,
calculate, based on the degree of conformance to each of the set of relevant requirements and the relative weight of each of the set of relevant requirements, an AI safety score for the AI-based product,
determine that the AI safety score at least meets a threshold score,
in response to determining that the AI safety score at least meets the threshold score, certify the AI-based product, and
generate a report communicated to a user electronic device, the report indicating at least one of the AI safety score, a certification of the AI-based product, or a recommendation for improvement or an action to achieve certification if not certified.

8. The system of claim 7, wherein the at least one computer processor is configured to execute the set of computer-readable instructions to further cause the at least one computer processor to:
determine a risk level of the AI-based product, and
determine, based on the risk level of the AI-based product, the threshold score.

9. The system of claim 7, wherein to calculate the AI safety score for the AI-based product, the at least one processor is configured to:
calculate the AI safety score based on (i) a summation of a product of the degree of conformance to each of the set of relevant requirements and the relative weight of each of the set of relevant requirements divided by (ii) a summation of the relative weight of each of the set of relevant requirements.

10. The system of claim 7, wherein to analyze the description of the AI-based product to determine the set of relevant requirements, the at least one processor is configured to:
analyze, using the trained machine learning model by the at least one computer processor, the description of the AI-based product, and
based on analyzing the description of the AI-based product, output, by the trained machine learning model, a binary value for each of the set of requirements for each of the plurality of AI safety principles, wherein a binary value of one (1) indicates that the requirement is a relevant requirement.

11. The system of claim 7, wherein to determine, based on the description of the AI-based product for each of the set of relevant requirements, the degree of conformance to that relevant requirement, the at least one processor is configured to:
determine, based on the description of the AI-based product for each of the set of relevant requirements, the degree of conformance to that relevant requirement, wherein the degree of conformance is between zero (0) and one (1).

12. The system of claim 7, wherein to determine, based on the description of the AI-based product for each of the set of relevant requirements, the relative weight of that relevant requirement, the at least one processor is configured to:
determine, based on the description of the AI-based product by the at least one computer processor for each of the set of relevant requirements, the relative weight of that relevant requirement, wherein the relative weight is between zero (0) and one (1).

13. A non-transitory computer-readable storage medium configured to store instructions executable by one or more processors to assess artificial intelligence (AI) safety scores for AI-based products according to a plurality of AI safety principles, wherein each of the plurality of AI safety principles has a set of requirements associated therewith, the instructions comprising:
instructions for accessing a training dataset comprising a training set of descriptions associated with a training set of AI-based products;
instructions for training a machine learning model using the training dataset to infer a relevancy of each requirement of the plurality of AI safety principles by analyzing at least one of patterns, relationships, or contextual clues found within the training set of descriptions associated with the training set of AI-based products to recognize at least one of a feature, a functionality, or a contextual factor that implies the relevancy of that requirement to one or more of the training set of AI-based products;

instructions for accessing a description of an AI-based product;

instructions for analyzing, using the trained machine learning model, the description of the AI-based product to determine a set of relevant requirements, of the set of requirements for each of the plurality of AI safety principles, wherein each of the set of relevant requirements is determined to be relevant to the AI-based product;

instructions for determining, based on the description of the AI-based product for each of the set of relevant requirements, (i) a degree of conformance to that relevant requirement, and (ii) a relative weight of that relevant requirement;

instructions for calculating, based on the degree of conformance to each of the set of relevant requirements and the relative weight of each of the set of relevant requirements, an AI safety score for the AI-based product;

instructions for determining that the AI safety score at least meets a threshold score;

instructions for, in response to determining that the AI safety score at least meets the threshold score, certifying the AI-based product; and instructions for generating a report communicated to a user electronic device, the report indicating at least one of the AI safety score, a certification of the AI-based product, or a recommendation for improvement or an action to achieve certification if not certified.

14. The non-transitory computer-readable storage medium of claim 13, wherein the instructions further comprise:

instructions for determining a risk level of the AI-based product; and instructions for determining, based on the risk level of the AI-based product, the threshold score.

15. The non-transitory computer-readable storage medium of claim 13, wherein the instructions for calculating the AI safety score for the AI-based product comprise:

instructions for calculating the AI safety score based on (i) a summation of a product of the degree of conformance to each of the set of relevant requirements and the relative weight of each of the set of relevant requirements divided by (ii) a summation of the relative weight of each of the set of relevant requirements.

16. The non-transitory computer-readable storage medium of claim 13, wherein the instructions for analyzing the description of the AI-based product to determine the set of relevant requirements comprise:

instructions for analyzing, using the trained machine learning model, the description of the AI-based product; and instructions for, based on analyzing the description of the AI-based product, outputting, by the trained machine learning model, a binary value for each of the set of requirements for each of the plurality of AI safety principles, wherein a binary value of one (1) indicates that the requirement is a relevant requirement.

17. The non-transitory computer-readable storage medium of claim 13, wherein the instructions for determining, based on the description of the AI-based product for each of the set of relevant requirements, the degree of conformance to that relevant requirement comprise:

instructions for determining, based on the description of the AI-based product for each of the set of relevant requirements, the degree of conformance to that relevant requirement, wherein the degree of conformance is between zero (0) and one (1).

18. The non-transitory computer-readable storage medium of claim 13, wherein the instructions for determining, based on the description of the AI-based product for each of the set of relevant requirements, the relative weight of that relevant requirement comprise:

instructions for determining, based on the description of the AI-based product for each of the set of relevant requirements, the relative weight of that relevant requirement, wherein the relative weight is between zero (0) and one (1).

* * * * *